GROUP DELAY SLOPE AND CURVATURE EQUALIZING SYSTEM WITH CONTROL VOLTAGES OBTAINED FROM SECOND HARMONICS OF PILOT SIGNALS

Filed March 12, 1964 6 Sheets-Sheet 2

MANUAL AND AUTOMATIC GROUP DELAY SLOPE EQUALIZATION

Aug. 1, 1967 T. SÁRKÁNY ETAL 3,334,301

GROUP DELAY SLOPE AND CURVATURE EQUALIZING SYSTEM WITH CONTROL VOLTAGES OBTAINED FROM SECOND HARMONICS OF PILOT SIGNALS

Filed March 12, 1964 6 Sheets-Sheet 5

United States Patent Office 3,334,301
Patented Aug. 1, 1967

3,334,301

GROUP DELAY SLOPE AND CURVATURE EQUALIZING SYSTEM WITH CONTROL VOLTAGES OBTAINED FROM SECOND HARMONICS OF PILOT SIGNALS

Tamás Sárkány and András Baranyi, both of Budapest, Hungary, assignors to Távközlési Kutató Intézet, Budapest, Hungary, a firm Filed Mar. 12, 1964, Ser. No. 351,388
Claims priority, application Hungary, Mar. 14, 1963, TA–764
3 Claims. (Cl. 325—48)

This invention relates to a method of and circuit arrangement for automatic group delay time equalization in a frequency modulation radio relay system transmitting television or multichannel telephony baseband signals. More particularly, auxiliary signals transmitted together with the television or multichannel telephony baseband signals are utilized to operate electronically adjustable group delay equalizer networks to compensate for the group delay distortion of the frequency modulation radio relay system.

Linear distortion of carrier circuits is brought about by the frequency dependence of the amplitude-frequency and of the group delay frequency characteristics. In wide-band frequency modulated radio systems, suitable amplitude-frequency characteristics can be realized by proper design of amplifiers, but separate so-called group delay equalizers are applied to reduce the variation of the group delay-frequency characteristic. The frequency characteristic of equalizers compensates for the variation of the transmission system, and thus the over-all variation is considerably reduced.

In equalizers generally used, only passive circuit elements are applied. However, equalizers containing vacuum-tubes are also used, and by controlling the grid bias of vacuum tubes, adjustable group delay characteristics are realized. The present invention is directed to an electronically variable equalizer. A typical presently used adjustable equalizer is described in a paper entitled "A Broad Band Variable Group Delay Equalizer," by R. Hamer and G. Wilkinson, published in the Post Office Electrical Engineer's Journal, vol. 50, 1957, page 120, and in another paper "VHF Broad Band Variable Group Delay Equalizers," by R. Hamer and G. Wilkinson, published in the Journal Electronic Engineering, vol. 33, August 1961, page 506.

The adjustable equalizers described in the above articles have mixed first and second order group delay frequency characteristics, and thus usually are made up of two parts: one serves for adjusting the slope of the group delay characteristic (the coefficient of the first order term), and the other for adjusting the curvature of the group delay characteristic (the coefficient of the second order term).

The variable equalizers possess mixed first and second order characteristics, and thus usually contain two controls: one serves for adjusting the slope of the group delay characteristic (the coefficient of the first order term), and the other for adjusting the curvature of the group delay characteristic (the coefficient of the second order term).

The group delay characteristics of amplifiers and equalizers show slight variations with time (due to aging of vacuum tubes and components and to ambient temperature changes), and owing to this, re-adjustment of equalizers from time to time is required for fulfilling the requirements of the transmission system. This re-adjustment increases the maintenance cost of the system and necessitates the use of special measurement gear and personnel; furthermore, during the time of re-adjustment, the system is inoperative recognizing these difficulties, various automatic equalization systems have been proposed in the literature.

One such recent automatic equalization system has been proposed in the paper "Automatic Control of Distortion in Wide Band Frequency Modulated Microwave Links," by J. Tolman, published in the Journal of Electronic Engineering, vol. 31, Dec. 1959. This system is intended for use in microwave links carrying multichannel telephony signals, and is based on the following principles. A band-pass filter is connected to the baseband output of the link, tuned to a frequency above the frequency range covered by the baseband of the multichannel signal transmitted. The intermodulation noise output of this filter, utilized as a control signal, is made to rotate a motor coupled to a variable equalizer, so as to reduce the intermodulation noise to a minimum value. The principle of this system is only applicable in case of multichannel transmission, and not in the case of television transmission.

However, it is well known that the advent of color television has increased the performance requirements to be met by microwave links, and that in case of transmission of color television signals according to the NTSC standard, the group delay characteristic of the link has to meet exacting requirements. The present invention is therefore related to an automatic group delay equalization system fulfilling these up-to-date requirements.

According to the present invention, two auxiliary signals at most are transmitted in addition to the baseband signal through the frequency modulation system; a high frequency subcarrier signal having a frequency higher than the upper frequency boundary of this baseband signal, and a low frequency control signal having a frequency lower than the lower frequency boundary of the baseband signal. The invention is based on the discovery that at the receiving end of the system, the high frequency subcarrier will be phase modulated by the low frequency control signal due to the group delay distortion of the system. Thus the high frequency subcarrier signal will be modulated in phase by the signal transmitted and a voltage proportional to the group delay variation will be produced by demodulating this subcarrier signal. Automatic control of the equalizer may be realized by feeding this voltage to the control terminal of an electronically variable group delay equalizer, and manual adjustment of the equalizer during operation is possible by achieving minimum voltage indication by feeding of a voltage indicator fed by this voltage. The wave form of the base band signal and the phase modulation of the subcarrier signal are both a function of the information transmitted, and accordingly, both the control voltage and the group delay characteristic would be determined by this voltage, which is an undesirable result. Accordingly, in the present invention, a low frequency control signal is transmitted in addition to the above-mentioned high frequency subcarrier signal, with the low frequency control signal having a frequency lower than the lower band limit of the base band signal and being at a constant amplitude. This low frequency control signal is filtered out from the demodulated subcarrier signal and utilized as a voltage proportional to the group delay variation.

The appearance of the subcarrier phase modulation can be understood by considering the well known fact that linear distortion in the carrier frequency parts brings about nonlinear distortion in the baseband; thus, the group delay distortion, which is a linear distortion, has the effect of the subcarrier in the carrier frequency part, has the effect that the demodulated subcarrier at the receiving end will show phase modulation, which is a nonlinear distortion (also called intermodulation distortion). In the invention, no separate modulating signal is used as the modulation process is brought about by the carrier frequency system itself.

According further to the invention, a voltage proportional to the group delay variation of the system is produced by demodulating said high frequency subcarrier at the receiving end of the transmission system thus obtaining a low frequency signal. The frequency spectrum of this low frequency signal will comprise several frequency components depending on the baseband signal transmitted, and will also contain the component corresponding to said control oscillator. Theoretical analysis shows that in general, this control oscillator signal component will not be sinusoidal, and the fundamental frequency component, which is equal to said control frequency, will be proportional to the slope of the group delay characteristic, and the second harmonic frequency component will be proportional to the curvature of the group delay characteristic. It may also be shown that the phase of the fundamental frequency component is determined by the polarity of the slope, and the phase of the second harmonic frequency component by the polarity of the curvature. Thus, passing the demodulated subcarrier signal through two bandpass filters, tuned to the fundamental and to the second harmonic frequency of the control oscillator, and connecting the output terminals of these band-pass filters on two phase sensitive detectors, variable voltages will be obtained which will be suitable for the automatic control of the slope and curvature of said electronically adjustable group delay equalizers.

The present invention relates to a method and arrangement for automatic or manual control of the group delay characteristic of a transmitting system, eliminating in case of automatic control the necessity of said re-adjustment and thus resulting continuously in highest quality signal transmission and economic maintenance. Thus in the case of manual control the adjustment for minimum group delay variation is achieved without using any special measuring instruments and without interrupting the continuous operation of the system.

It is to be noted that in many cases it is not necessary to generate separately a high frequency subcarrier signal and a low frequency control signal, as the transmitting system may transmit these signals anyway for other purposes. In such a case, these signals used for other purposes are also utilized to control the group delay characteristic according to the invention, without disturbance of the original applications. For the high frequency subcarrier, the audio subcarrier used for television sound transmission can also be applied, having a customary frequency of 8 mc./s. in microwave links, or the pilot signal used for switch-over to a stand-by channel in multi RF-channel links, having a customary frequency of 8.5 mc./s. For the low frequency control signal, a low frequency component continuously present in the baseband signal may also be utilized; such a signal may be in case of television transmission on the video line synchronizing component (15625 cycles per second in the European standard, 15750 cycles per second in the American standard), and in case of multichannel telephony transmission, one of the low frequency group or super-group pilot signals.

With these supplements stated above the method according to the invention is modified as follows: a high frequency subcarrier signal used for other purposes and a low frequency component of the baseband signal transmitted are made use of as auxiliary signals so that the voltage proportional to the variation of the group delay characteristic is established from the demodulated subcarrier signal by filtering out said low frequency component.

Suppose in the followings that the signal used for control is sinusoidal having a frequency $f$. According to analysis, the signal re-established by demodulating the subcarrier is not sinusoidal any more, the fundamental frequency component $f$ being proportional to the slope of the group delay characteristic, and the second harmonic frequency component $2f$ being proportional to the curvature of the group delay characteristic. The phase of the fundamental frequency component $f$ is determined by the polarity of the slope, and the phase of the second harmonic frequency component $2f$ by the polarity of the curvature. Thus, giving the demodulated signal through two band-pass filters, tuned to frequency $f$ and $2f$, respectively, on two phase sensitive detectors and voltage indicators, the output voltages of the two phase sensitive detectors will be suitable for automatic control of the slope and curvature of said electronically variable group delay equalizer. It should be noted that manual adjustment of the characteristic can be achieved by noting the minimum indication of the voltage indicators and by using suitable D.C. voltage supplies. Thus, manual adjustment for minimum group delay variation can be performed during operation, since the voltage indication information which is needed for control is continuously present, and in this way the necessity of measuring the characteristic by means of special and expensive measurement instrumentation as well as the interruption of service is completely eliminated.

FIG. 1*a* shows some of the characteristics obtained by adjusting the slope control with the curvature control set to zero.

FIG. 1*b* shows the characteristics obtained by adjusting the curvature control with the slope control set to zero.

Figure 5:
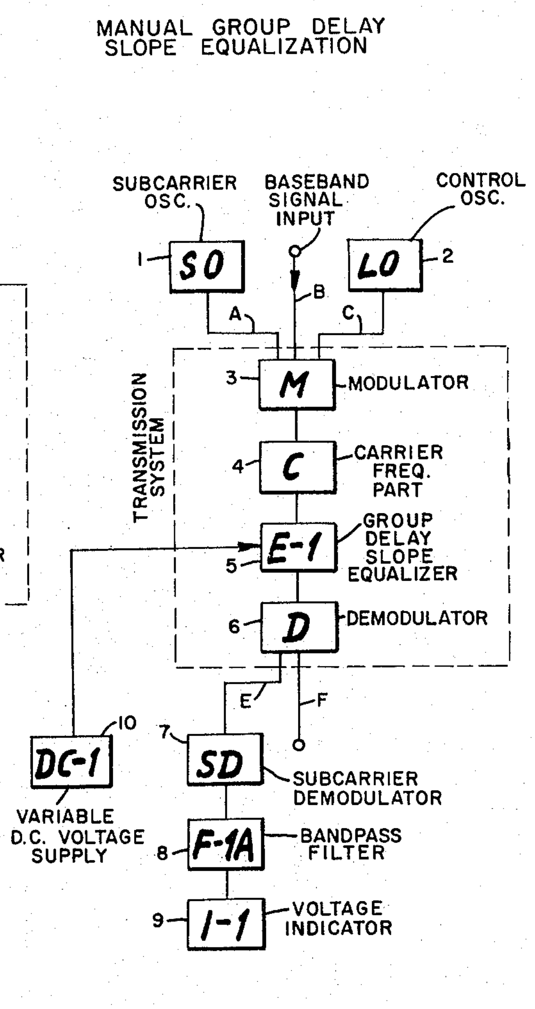
FIG. 5 is a schematic block diagram of a system for manual control of group delay slope.

Referring to FIG. 5, which shows the arrangement for manual control of group delay slope, the modulator 3 has three input terminals, i.e., terminal B connected to the input baseband signal source, terminal A connected to the output of the subcarrier oscillator 1 which provides a signal having a frequency higher than the upper limit of the base-band transmitted, and terminal C connected to the output of low frequency control oscillator 2, which provides a signal having a frequency lower than the lower limit of the baseband transmitted. The output of modulator 3 is fed to the carrier frequency part 4, of the equipment, with the output of carrier frequency part 4 being connected to the group delay slope equalizer 5, whose output is connected to demodulator 6. Demodulator 6 has a pair of outputs, E and F, with output E serving to connect the subcarrier oscillator signal to the subcarrier demodulator 7, and output terminal F serving as the output terminal of the transmitting system. The output of subcarrier demodulator 7 is filtered by band pass filter 8, which is tuned to the frequency of low frequency oscillator 2 and then fed to voltage indicator 9. A variable voltage D.C. supply 10 is connected to group delay equalizer 5, so that minimum group delay variation may be achieved by varying the output of D.C. supply 10.

Figure 6:
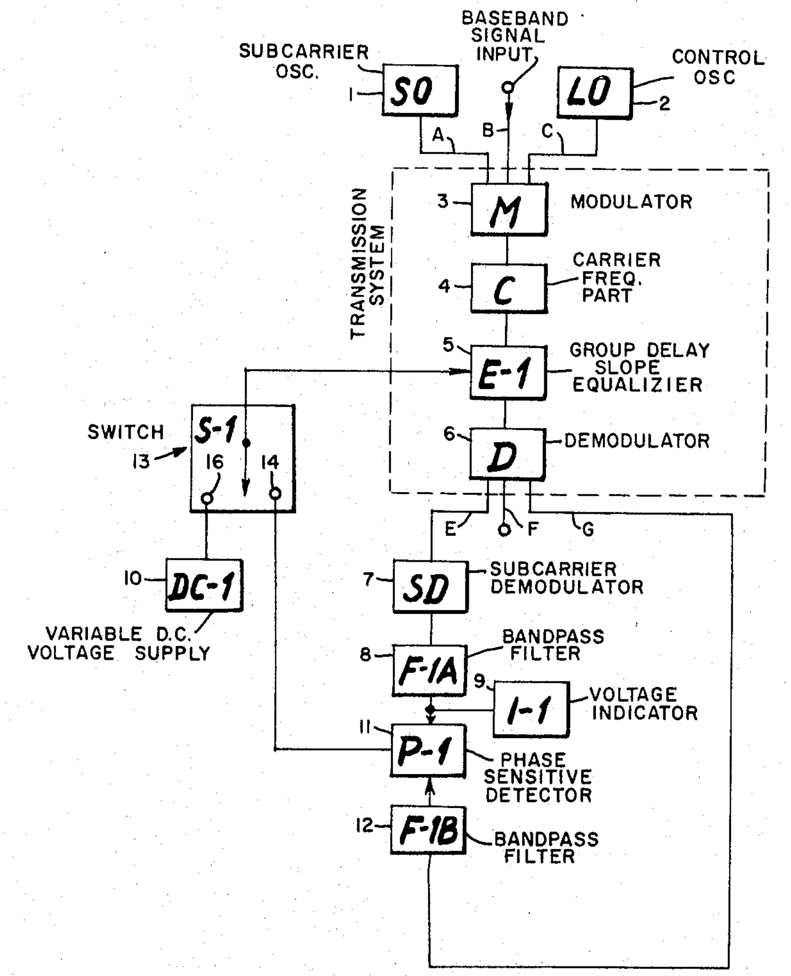
FIG. 6 is a schematic block diagram of a system for alternate automatic and manual control of group delay slope.

Referring to FIG. 6, the circuit arrangement for alternately providing automatic and manual control of group delay slope is seen to be similar in some respect to the arrangement of FIG. 5, with the similar components bearing the same identification numerals. FIG. 6 additionally shows a phase sensitive detector 11 connected to the output of band pass filter 8, and a second band pass filter 12 connected between the third output terminal G of demodulator 6, and phase sensitive detector 11. A two position switch 13 is provided, whereby in switch position 14, the output of phase sensitive detector 11 is connected to the slope control terminal D of group delay equalizer 5, and in switch position 16 manually variable D.C. voltage supply 10 is connected to group delay equalizer 5, i.e. as in FIG. 5.

Figure 1:
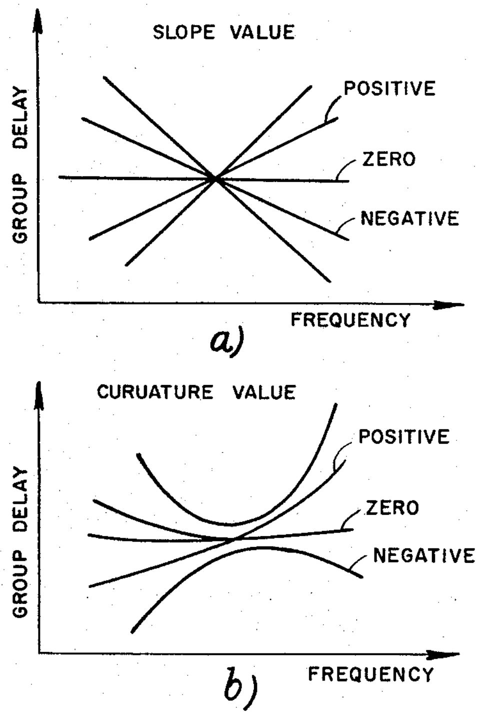
Figure 2:
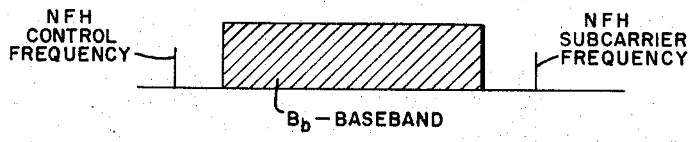
FIG. 2 illustrates the frequency spectrum of the transmission system input signal in accordance with the principles of the present invention.

In FIG. 2 the frequency spectrum of the transmission system input signal according to the invention is illustrated: the control frequency is lower than the lower boundary of the baseband, and the subcarrier frequency is higher than the upper boundary of the baseband. However, as mentioned earlier, both the control and the subcarrier frequency signal may be comprised in the baseband signal itself, and in this case, these signals used for other purposes are also utilized to control the group delay characteristic as described in the following.

Figure 3:
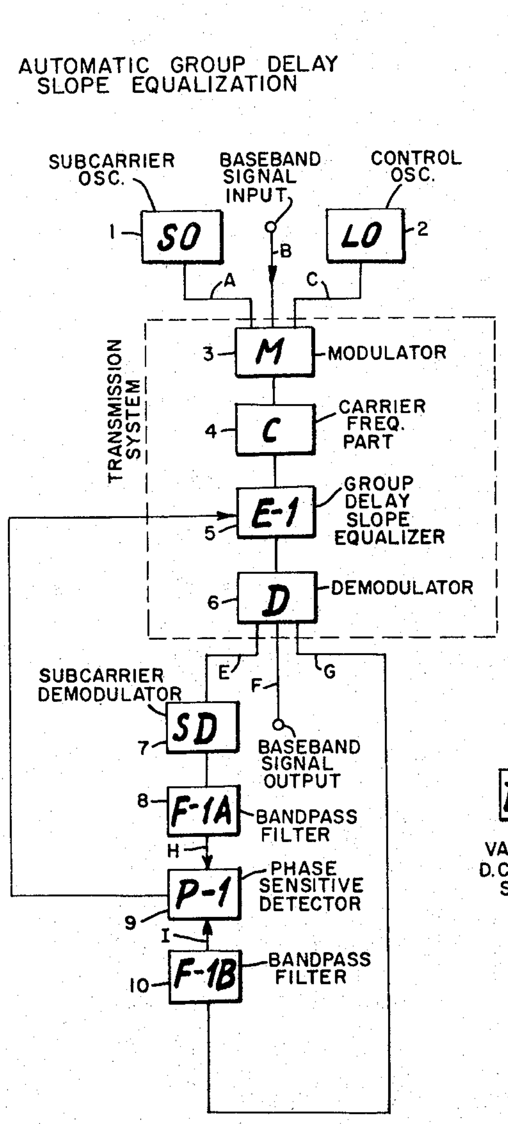
FIG. 3 is a schematic block diagram of a system for automatic group delay slope equalization employing the principles of the present invention.

In FIG. 3, which shows a block-diagram for automatic group delay slope equalization, unit 1 is the subcarrier oscillator and unit 2 the control oscillator mentioned above. Unit 3 is the modulator of the transmission system to be equalized having three input terminals A, B and C, the subcarrier oscillator 1 feeding terminal A, the control oscillator feeding terminal C, and the input baseband signal to be transmitted by the transmission system feeding terminal B. Unit 4 is the carrier frequency part of the system which can represent a chain of radio relay repeaters interconnecting the transmitting and receiving terminal of a radio relay system. Unit 5 is the electronically adjustable group delay slope equalizer which may produce characteristics as shown in FIG. 2*a* in response to different voltages applied to the control terminal D. Unit 6 is the demodulator of the system to be equalized having three output terminals denoted E, F, and G, terminal F supplying the output baseband signal. Terminals E and G are utilized to provide the automatic control voltage for the group delay slope equalizer 5 according to the principles of the invention. As stated before, the output subcarrier will be phase modulated due to the group delay distortion of the system, and this phase modulation is demodulated by the subcarrier demodulator unit 7 thus obtaining a low frequency signal having a frequency component corresponding to the frequency of control oscillator 2. In order to recover this frequency component, the output of subcarrier demodulator 7 is given on the band-pass filter No. 1, tuned to the frequency of control oscillator 2, thus producing a first demodulated control signal, the magnitude of which is proportional to the slope of the group delay characteristic, and the relative phase of which corresponds to the polarity of the slope of the group delay characteristic. This first demodulated control signal is connected to the first input terminal H of unit 9, a phase sensitive detector. This unit supplies an output D.C. voltage at terminal J which is proportional to the magnitude of the control signal voltage at input terminal H, the polarity of this D.C. voltage corresponding to the relative phase of the control signal voltage at input terminal H. Thus, a given group delay slope of the system, for instance, the positive slope shown in FIG. 2, the control voltage produces, say, a positive going output voltage, and the negative slope shown in FIG. 2, the control voltage produces a negative going output voltage at output terminal J. This control voltage is seen to be suitable for controlling the slope of the group delay characteristic of said system, and therefore output terminal J of the phase sensitive detector is connected to the input control terminal D of the group delay slope equalizer 5. In order to insure the phase sensitivity of unit 9, a second demodulated control signal serving as reference voltage is required at the second input terminal I of the phase sensitive detector 9. This second demodulated control signal is obtained by connecting the output terminal G of demodulator 6 through a band-pass filter No. 2, unit 10, tuned also to the frequency of control oscillator 2, to said input terminal.

It is to be noted that for the sake of simplicity, both signals appearing at the input terminals H and I of the phase sensitive detector 9 are called in the proceedings as "demodulated control signals." However, it is understood that the "first demodulated control signal" appearing at input terminal H of unit 9, the magnitude of which is proportional to the group delay slope, appears as a result of two demodulations: first, the subcarrier is demodulated in the demodulator 6 of the transmission system receiving terminal, and second, the first control voltage is demodulated in the subcarrier demodulator. On the other hand, the "second demodulated control signal" appearing at input terminal I of unit 9, which serves for phase reference, appears as a result of a single demodulation only: it is demodulated in the demodulator 6 of the transmission system receiving terminal.

Figure 4:
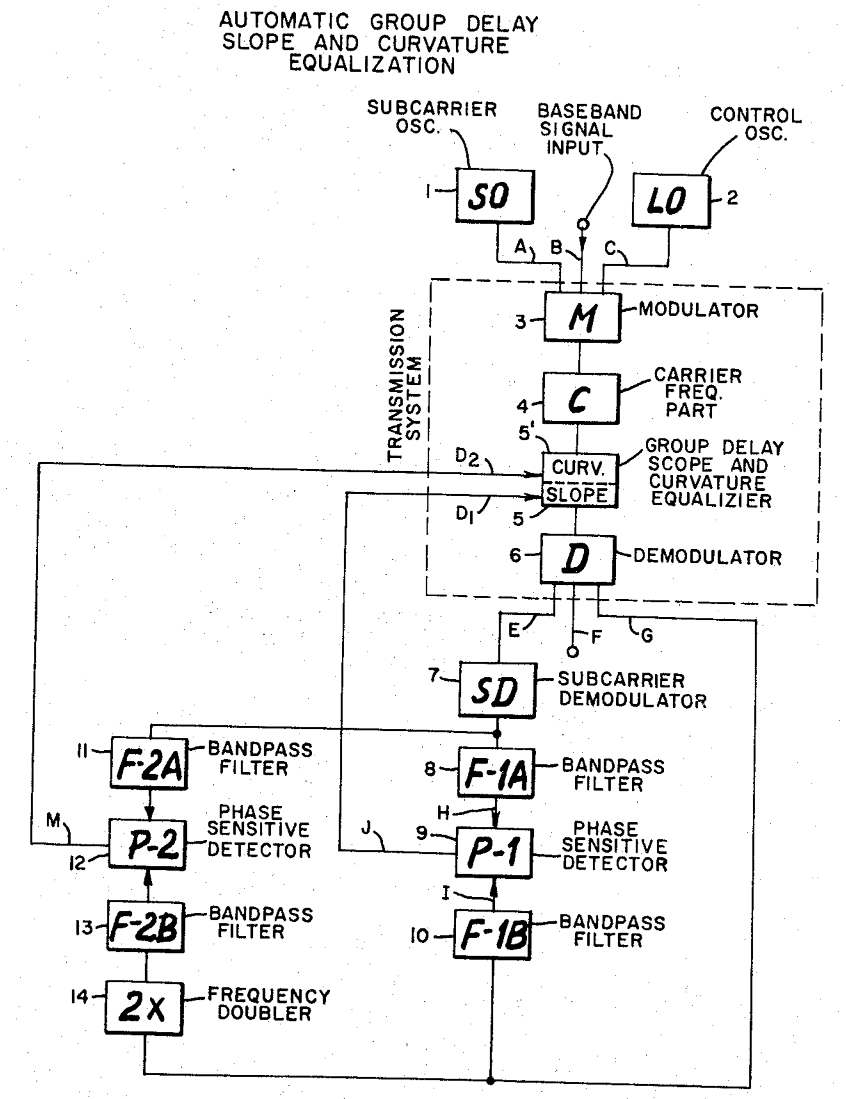
FIG. 4 is a schematic block diagram of a system for both automatic group delay slope and curvature equalization employing the principles of the present invention.

The system described in the foregoing in connection with FIG. 3 serves for group delay slope equalization only. A modification of this apparatus providing both group delay slope and group delay curvature equalization is shown in FIG. 4. In FIG. 4 all units of FIG. 3 are utilized thus providing slope equalization according to the above description, but additional elements are also made use of to achieve curvature equalization too. Thus, in the transmission system, a group delay slope equalizer 5 and a group delay curvature equalizer 5' are connected in cascade. In the part attached to the demodulator 6, a second phase sensitive detector unit 12, with the additional band-pass filters 11 and 13, both tuned to the second harmonic of the frequency of control oscillator 2, are utilized to provide a control voltage at output terminal M suitable to be connected to the input control terminal D' of the group delay curvature equalizer 5'. The band-pass filter 11 is driven by the same subcarrier demodulator output voltage as the band-pass filter 8 described in connection with FIG. 3. The band-pass filter 13 is connected to the output of a frequency doubler 14, the input of which is connected to output terminal G of demodulator 6, which is the same terminal which also feeds band-pass filter 10 described in connection with FIG. 3.

Figure 7:
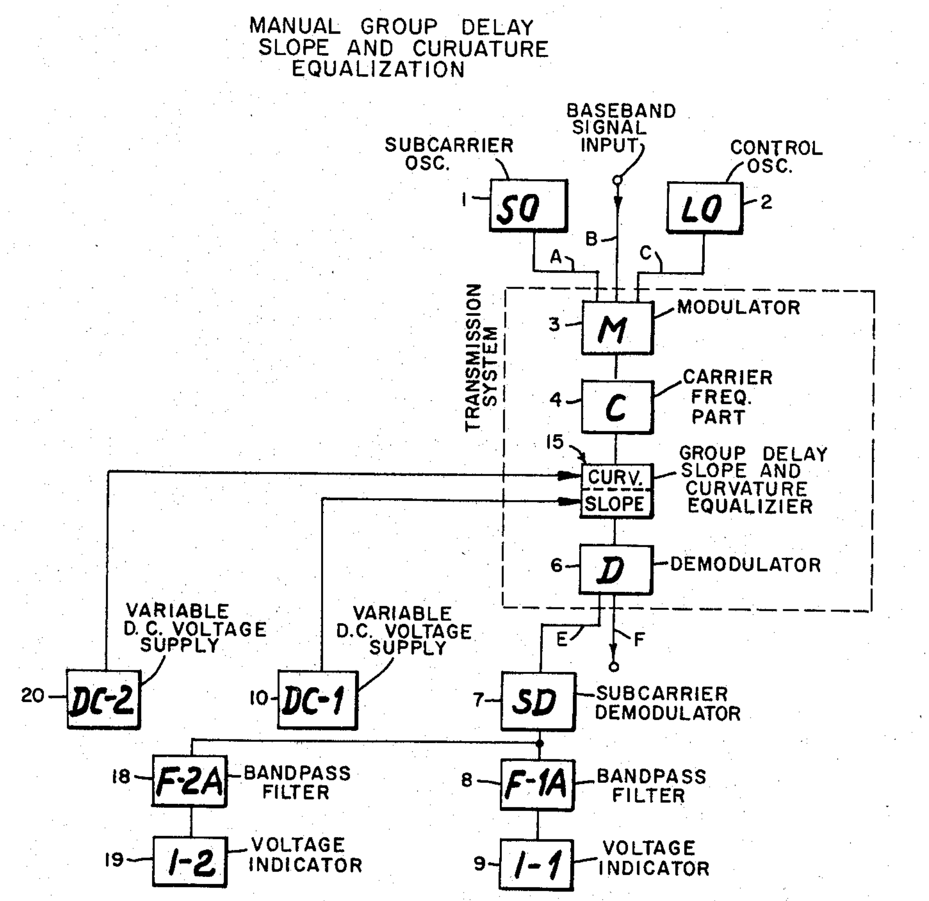
FIG. 7 is a schematic block diagram of a system for manual control of group delay slope and curvature.
Figure 8:
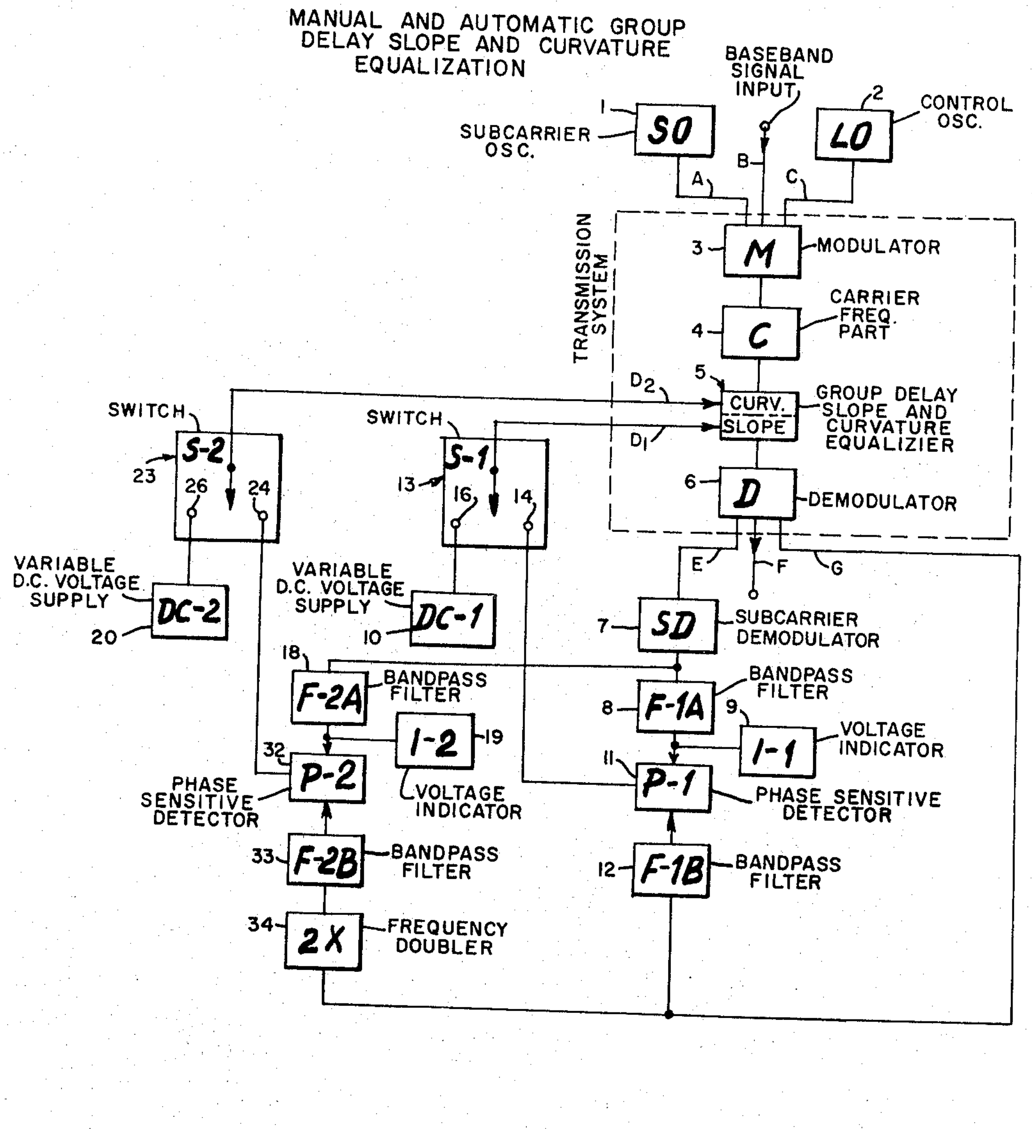
FIG. 8 is a schematic block diagram of a system for alternate automatic and manual control of group delay slope and curvature.

Referring to FIG. 7 there is shown a circuit arrangement for providing manual control of group delay slope and curvature. As shown in FIG. 7, the electronically variable equalizer 15 is inserted between the carrier part 4 and the demodulator 6. First and second selectively variable D.C. voltage supplies 10 and 20 are connected to the inputs of equalizer 15, with voltage supply 10 controlling the slope and voltage supply 20 controlling the curvature of the group delay characteristic in accordance with the voltage indications of indicators 9 and 10 respectively to achieve minimum group delay variation. The output of subcarrier demodulator 7, in addition to being fed to first voltage indicator 9 through band pass filter 8, is also fed to a second voltage indicator 19 through a second band pass filter 18 which is tuned to the second harmonic of the low frequency oscillator 2. Referring to FIG. 8, there is shown the circuit arrangement for alternately providing automatic and manual control of group delay slope and curvature. The arrangement of FIG. 8 is seen to comprise essentially a combination of the arrangements of FIGS. 4 and 6, with the provision of an additional two position switch 23 whereby in switch position 24, the output of the second phase sensitive detector 22 is connected to the group delay curvature control terminal $D_2$ of equalizer 15, and in switch position 26, the manually selectively variable D.C. voltage supply 20 is connected to the control terminal $D_2$ of equalizer 15.

While there has been shown particular embodiment of the present invention, it will be understood that it is not wished to be limited thereto, since modifications can be made both in the circuit arrangements and components used, and it is contemplated in the appended claims to cover any such modifications as fall within the true spirit and scope of this invention.

What we claim is:

1. In a frequency modulation radio system for transmitting television and multichannel telephony baseband signals having a transmitter portion including a modulator, a carrier frequency portion and a receiver portion including a demodulator, correcting means for automatically correcting group delay slope and curvature distortion originating in said carrier frequency portion of said radio system, said correcting means comprising, carrier generator means in said transmitter portion of said radio system for generating a subcarrier signal having a frequency higher than the upper limit of said base-band signal and a control signal having a frequency lower than the lower limit of said baseband signal, input means for said modulator having first and second input terminals for application thereto of said subcarrier signal and said control signal respectively, and a third input terminal for the input of said baseband signal, adjusting means in said carrier frequency portion including voltage adjustable group delay slope equalizer having a control input terminal, and a voltage adjustable group delay curvature equalizer having a control input terminal, output means for said demodulator having first and second output terminals for providing an output subcarrier signal and an output control signal respectively, and a third output terminal serving as the output terminal of the receiver portion, subcarrier demodulator means connected to said first demodulator output terminal for demodulating said output subcarrier signal to obtain a low frequency signal having voltage components corresponding to the fundamental frequency and to the second harmonic frequency of said control signal, fundamental frequency filter means connected to said subcarrier demodulator means for filtering out said fundamental frequency component from said low frequency signal to produce a first demodulated control signal, control signal filtering means connected to said second demodulator output terminal for filtering out said output control signal from said second output terminal to produce a second demodulated control signal, first detector means having first and second input terminals for application thereto of said first and second demodulated control signals respectively, to produce a first variable voltage signal proportional to said first demodulated signal and having a polarity corresponding to the phase difference between said first and second demodulated control signals, first connecting means for applying said first variable voltage signal to said control input terminal of said group delay slope equalizer to compensate for the group delay slope distortion of said radio system, control signal second harmonic filter means connected to said subcarrier demodulator for filtering out said second harmonic frequency voltage component from said low frequency signal to produce a third demodulated control signal, frequency doubling means connected to said second demodulator output terminal for doubling the frequency of said output control signal, control signal second harmonic filter means connected to said frequency doubling means for filtering out the voltage component corresponding to the second harmonic of said output control signal to produce a fourth demodulated control signal, second detector means having first and second input terminals for application thereto of said third and fourth demodulated control signals to produce a second variable voltage signal proportional to said third demodulated control signal and having a polarity corresponding to the phase difference between said third and fourth demodulated control signals, and second connecting means for applying said second variable voltage signal to said group delay curvature equalizer to compensate for the group delay curvature distortion of said radio system.

2. In a frequency modulation radio system for transmitting television and multichannel telephony baseband signals, having a transmitter portion including a modulator, a carrier frequency portion and a receiver portion including a demodulator; correcting means for manually correcting group delay slope and curvature distortion originating in said carrier frequency portion of said radio system, said correcting means comprising carrier generator means in said transmitter portion of said radio system for generating a subcarrier signal having a frequency higher than the upper limit of said baseband signal and a control signal having a frequency lower than the lower limit of said baseband signal, input means for said modulator having first and second input terminals for the application thereto of said subcarrier signal and said control signal respectively, and a third input terminal for the input of said baseband signal, adjusting means in said carrier frequency portion including a voltage adjustable group delay slope equalizer having a control input terminal, and a voltage adjustable group delay curvature equalizer having a control input terminal, output means for said demodulator having a first output terminal for providing an output subcarrier signal and a second output terminal serving as the output terminal of the receiver portion; subcarrier demodulator means connected to said first demodulator output terminal for demodulating said output subcarrier signal to obtain a low frequency signal having voltage components corresponding to the fundamental frequency and to the second harmonic frequency of said control signal; fundamental frequency filter means connected to said subcarrier demodulator means for filtering out said fundamental frequency component from said low frequency signal to produce a first demodulated control signal, first voltage indicator means connected to the output of said fundamental frequency filter means, control signal second harmonic filter means connected to said subcarrier demodulator for filtering out said second harmonic frequency voltage component from said low frequency signal to produce a second demodulated control signal, second voltage indicator means connected to the output of said control signal second harmonic filter means, a first manually variable D.C. voltage supply connected to said control input terminal of said group delay slope equalizer and a second manually variable D.C. voltage supply connected to the control input terminal of said group delay curvature equalizer, whereby minimum group delay variation may be achieved by selectively varying the outputs of said first and second manually variable D.C. voltage supplies in accordance with the outputs of said first and second voltage indicators respectively.

3. In a frequency modulation radio system for transmitting television and multichannel telephony base band signals, having a transmitter portion including a modulator, a carrier frequency portion and a receiver portion including a demodulator; correcting means for alternate manual and automatic correction of group delay slope and curvature distortion originating in said carrier frequency portion of said radio system, said correcting means comprising, carrier generator means in said transmitter portion of said radio system for generating a subcarrier signal having a frequency higher than the upper limit of said baseband signal and a control signal having a frequency lower than the lower limit of said baseband signal; input means for said modulator having first and second input terminals for the application thereto of said subcarrier signal and said control signal respectively, and a third input terminal for the input of said baseband signal; adjusting means in said carrier frequency portion including a voltage adjustable group delay slope equalizer having a control input terminal, and a voltage adjustable group delay curvature equalizer having a control input terminal; output means for said demodulator having a first output terminal for providing an output subcarrier signal, a second output terminal for providing an output control signal, and a third output terminal serving as the output terminal of the receiver portion; subcarrier demodulator means connected to said first demodulator output terminal for demodulating said output subcarrier signal to obtain a low frequency signal having voltage components corresponding to the fundamental frequency and to the second harmonic frequency of said control signal; fundamental frequency filter means connected to said subcarrier demodulator means for filtering out said fundamental frequency component from said low frequency signal to produce a first demodulated control signal; control signal filtering means connected to said second demodulator output terminal for filtering out said output control signal from said second output terminal to produce a second demodulated control signal; first detector means having first and second input terminals for application thereto of said first and second demodulated control signals, respectively, to produce a first variable voltage signal proportional to said first demodulated signal and having a polarity corresponding to the phase difference between said first and second demodulated control signals; a first voltage indicator connected to the output of said fundamental frequency filter means, control signal second harmonic filter means connected to said subcarrier demodulator for filtering out said second harmonic frequency voltage component from said low frequency signal to produce a third demodulated control signal; frequency doubling means connected to said second demodulator output terminal for doubling the frequency of said output control signal; control signal second harmonic filter means connected to said frequency doubling means for filtering out the voltage component corresponding to the second harmonic of said output control signal to produce a fourth demodulated control signal; second detector means having first and second input terminals for application thereto of said third and fourth demodulated control signals to produce a second variable voltage signal proportional to said third demodulated control signal and having a polarity corresponding to the phase difference between said third and fourth demodulated control signals; second voltage indicator means connected to the output of said control signal second harmonic filter means; first and second manually variable D.C. voltage supplies; first switch means having first and second switch positions, said first manually variable D.C. voltage supply being connected to said first switch position of said first switch means and said first detector means being connected to said second switch position of said first switch means, whereby in said first switch position of said first switch means said first switch means is operative to connect said first manually variable D.C. voltage supply to said control input terminal of said group delay slope equalizer; and in said second switch position of said first switch means said first switch means is operative to connect said first detector means to said control input terminal of said group delay slope equalizer; second switch means having first and second switch positions, said second manually variable D.C. voltage supply being connected to said first position of said second switch means and said second detector means being connected to said second switch position of said second switch means, whereby in said first switch position of said second switch means said second switch means is operative to connect said second manually selectively variable D.C. voltage supply to said control input terminal of said group delay curvature equalizer, and in said second switch position of said second switch means said second switch means is operative to connect said second detector means to said control input terminal of said group delay curvature equalizer; thereby providing alternate manual and automatic slope and curvature control corresponding to said first and second switch position of said first and second switch means respectively.

References Cited

UNITED STATES PATENTS

| | | | |
|---|---|---|---|
| 2,379,744 | 7/1945 | Pfleger | 333—16 |
| 2,738,417 | 3/1956 | Hunt et al. | 325—65 |

FOREIGN PATENTS

| | | |
|---|---|---|
| 865,572 | 4/1961 | Great Britain. |

JOHN W. CALDWELL, *Acting Primary Examiner.*

B. V. SAFOUREK, *Assistant Examiner.*